(12) United States Patent
Weller et al.

(10) Patent No.: US 12,731,968 B2
(45) Date of Patent: Sep. 8, 2026

(54) CABLE DUCT FOR THE AUTOMATED WIRING OF AN ELECTRICAL CONTROL OR SWITCHING SYSTEM

(71) Applicant: RITTAL GMBH & CO. KG, Herborn (DE)

(72) Inventors: Ralf Weller, Driedorf (DE); Kevin Jung, Haiger (DE); Andreas Michael Bächler, Haiger (DE)

(73) Assignee: RITTAL GMBH & CO. KG, Herborn (DE)

(*) Notice: Subject to any disclaimer, the term of this patent is extended or adjusted under 35 U.S.C. 154(b) by 251 days.

(21) Appl. No.: 18/712,052

(22) PCT Filed: Nov. 28, 2022

(86) PCT No.: PCT/DE2022/100886

§ 371 (c)(1),
(2) Date: May 21, 2024

(87) PCT Pub. No.: WO2023/116966

PCT Pub. Date: Jun. 29, 2023

(65) Prior Publication Data

US 2026/0171769 A1 Jun. 18, 2026

(30) Foreign Application Priority Data

Dec. 20, 2021 (DE) ..................... 10 2021 133 811.5

(51) Int. Cl.
*H02G 1/08* (2006.01)
*H02G 3/04* (2006.01)

(52) U.S. Cl.
CPC ............. *H02G 3/0456* (2013.01); *H02G 1/08* (2013.01)

(58) Field of Classification Search
CPC ............................... H02G 3/0456; H02G 1/08
(Continued)

(56) References Cited

U.S. PATENT DOCUMENTS 6,803,519 B2 * 10/2004 de la Borbolla ..... H02G 3/0418 174/95
7,019,213 B1 * 3/2006 McNutt .................. H02G 3/045 174/101
2018/0006440 A1 * 1/2018 Lewinski ............... H02G 3/045

FOREIGN PATENT DOCUMENTS

DE 19828082 A1 12/1999
DE 20113694 U1 1/2003
(Continued)

OTHER PUBLICATIONS

International Search Report (English and German) and Written Opinion of the ISA (German) issued in PCT/DE2022/100886, mailed Feb. 22, 2023; ISA/EP.

*Primary Examiner* — Timothy J Thompson
*Assistant Examiner* — Michael F Mcallister
(74) *Attorney, Agent, or Firm* — Harness, Dickey & Pierce, P.L.C.

(57) ABSTRACT

A cable duct for the automated wiring of an electrical control or switching system, wherein the cable duct has a bottom for mounting on a base and two parallel side walls which are each formed by a plurality of tongues extending perpendicularly from the bottom, wherein adjacent tongues of the same side wall have between them a slot for the cable passage with a cable insertion aid which is arranged in an end position at a free end of the adjacent tongues facing away from the bottom], wherein the cable insertion aid in the end position opens in the direction of extension of the tongues from the free ends to the bottom into a tapering of the slot and the tapering of the slot opens into a widening of the slot.

16 Claims, 6 Drawing Sheets

(58) Field of Classification Search
USPC .......................................................... 174/68.3
See application file for complete search history.

(56) References Cited

FOREIGN PATENT DOCUMENTS

| | | | |
|---|---|---|---|
| DE | 202 14 553 | U1 | 3/2004 |
| DE | 10261051 | B4 | 11/2005 |
| DE | 69937025 | T2 | 5/2008 |
| EP | 0372452 | A1 | 6/1990 |
| EP | 1420493 | B1 | 7/2007 |
| EP | 1376797 | B1 | 12/2008 |
| EP | 1850434 | B1 | 11/2016 |
| ES | 278280 | U | 10/1984 |
| WO | 2021037305 | A2 | 3/2021 |

* cited by examiner

CABLE DUCT FOR THE AUTOMATED WIRING OF AN ELECTRICAL CONTROL OR SWITCHING SYSTEM

CROSS-REFERENCE TO RELATED APPLICATIONS

This application is a U.S. National Phase Application under 35 U.S.C. 371 of International Application No. PCT/DE2022/100886, filed on Nov. 28, 2022, which claims the benefit of German Patent Application No. 10 2021 133 811.5, filed on Dec. 20, 2021. The entire disclosures of the above applications are incorporated herein by reference.

BACKGROUND

This section provides background information related to the present disclosure which is not necessarily prior art.

TECHNICAL FIELD

The invention is based on a cable duct for the automated wiring of an electrical control or switching system, wherein the cable duct has a bottom for mounting on a base and two parallel side walls, which are each formed by a plurality of tongues extending perpendicularly from the bottom, wherein adjacent tongues of the same side wall have between them a slot for the cable passage with a cable insertion aid, which is arranged in an end position at a free end of the adjacent tongues facing away from the base. Such a cable duct is known from DE 201 13 694 U1. Similar cable ducts are also described in DE 102 61 051 B4 and DE 198 28 082 A1.

DISCUSSION

The cable ducts known from the prior art are established prior art in the field of manual wiring, but have proved to be unsuitable for automated wiring. This is due in particular to the fact that in automated wiring reworking, such as the manual repressing of conductors already laid in the cable duct, when these have subsequently moved out of the cable duct again due to their inherent elasticity, is hardly possible in an automated manner.

SUMMARY

This section provides a general summary of the disclosure and is not a comprehensive disclosure of its full scope or all of its features.

It is thus one aspect of the invention to provide a cable duct for automated wiring, which ensures the reliable insertion of the conductors into the cable duct and the reliable retention of the inserted cables in the cable duct.

Accordingly, it is provided that the cable insertion aid in the end position opens in the extension direction of the tongues from the free ends to the base into a tapering of the slot and preferably, but not necessarily, the tapering of the slot in turn opens into a widening of the slot.

The cable insertion aid can have the function of positioning the cables supplied to the tapering via the cable insertion aid in an automated manner, for example by means of an articulated arm robot, in relation to the tapering in such a way that when the cable is pressed further into the slot, the tapering widens its opening cross section in a reliable manner with elastic deformation of the adjacent tongues. For this purpose, the cable insertion aid can preferably be formed in a V-shaped, or substantially V-shaped, or funnel-shaped manner.

The tapering can close the slot formed between the adjacent tongues at the free end of the side wall or the tongues. For this purpose, the tapering can have a smaller opening width compared to the expected cross sections or diameters of the cables to be laid and possibly other lines. The tapering of the slot can thus assume the task of holding the cables and other lines once inserted into the slot via the cable insertion aid in the slot, when these, for example due to their inherent elasticity, press again in the direction of the free end of the tongues and could possibly exit there from the slot, if the slot were not closed, as is usual in the known cable ducts.

If the tapering in a relaxed state of the tongues does not completely or substantially completely close the slot, it can be provided that the tapering has a minimum opening width which is smaller than the cross section or diameter of a wire to be held in the cable duct.

If the cable duct, in particular the side walls of the cable duct, have further taperings which are arranged, for example, along the longitudinal edges of the tongues, in order to divide the cable duct into different placement sections in the height direction of the cable duct perpendicular to the bottom, the opening cross-section of the tapering adjacent to the insertion aid is preferably at least smaller than the minimum opening cross-section of the further taperings in the relaxed state of the tongues. The tapering is thus configured to hold cables, once inserted into the cable duct via the insertion aid, in the cable duct, in particular in the slot, after the cables have been driven into the slot, for example with the end effector of a robot provided for automated wiring, under pretensioning of the adjacent tongues and with widening of the tapering.

The widening can assume the function of allowing the cable to fall deeper into the slot due to its own weight, when the cable has been inserted into the cable duct with widening of the tapering, for example by an end effector of an articulated arm robot, overcoming the tapering.

In one embodiment, the cable insertion aid can be widened in the direction from the tapering to a cable insertion opening of the cable insertion aid. For example, the cable insertion aid can be widened in a V-shaped or substantially V-shaped manner in the direction from the tapering to the cable insertion opening.

If the widening is formed in a V-shaped or substantially V-shaped manner, the widening can have, for example, an inverted V-shape compared to the tapering.

The slot can have a constant width both in a section adjacent to the widening and also at least in sections over the length of the slot from the widening to the base.

The slot can have at least one further tapering along the length of the slot from the widening to the base. The further tapering can have the object of dividing the cable duct into different regions in the longitudinal direction of the tongues, for example in order to lay conductors grouped or separated over the height of the cable duct.

The slot can have at least two further taperings which have a passage cross-section with a different minimum opening width. This can serve to condition the cable duct in the longitudinal direction of the tongues, for example in order to receive conductors depending on their cross section or another sorting criterion, preferably according to the wiring sequence. The variability of the passage cross-section can also serve to compensate for the higher elasticity of the tongues in sections further away from the base compared to sections of the tongue arranged closer to the base and thus to provide a uniform, required prestressing force for overcoming the projections over the entire length of the tongues and for each of the projections.

For example, it can be provided that the minimum opening width of that one of the two further taperings which is further spaced apart from the base than the other further tapering is smaller than the minimum opening width of the further tapering arranged closer to the base.

The further tapering can be formed by a, preferably by exactly one, projection projecting into the slot on a first of two opposite longitudinal edges of the adjacent tongues delimiting the slot.

The longitudinal edges can be formed substantially straight and uncontoured, with the exception of the at least one projection which forms the further tapering between the opposite longitudinal edges and the slot formed between them.

The projection extending from the first longitudinal edge can be arranged upstream of the second longitudinal edge opposite the first longitudinal edge at a distance which corresponds to the opening width of the further tapering. In this case, the second longitudinal edge can be a straight and/or uncontoured longitudinal edge at least in the region of the further tapering, preferably also upstream and/or downstream of the tapering.

A plurality of the further taperings can be formed by in each case one, preferably by in each case exactly one, projection projecting into the slot, wherein the projections project into the slot in the longitudinal direction of the slot alternately starting from one of the two opposite longitudinal edges and can be arranged upstream of the in each case other, straight and/or uncontoured longitudinal edge while maintaining a minimum opening width of the respective further tapering.

The projections projecting into the slot alternately from the opposite longitudinal edges can form the slot in a meandering manner in the longitudinal direction of the slot.

At least one elastic retaining web can extend through the cable duct from a first of the two parallel side walls in the direction of the other side wall. In this case, the retaining web can have a length in this extension direction which is smaller than the distance of the two parallel side walls from each other. The retaining web has the function of holding cables already inserted into the cable duct in the cable duct, while the cable duct is not yet closed for the insertion of further wires, for example by means of a conventional cable duct cover, which is latched onto the free ends of the tongues.

The retaining web can have a free end at its end facing the opposite side wall. This makes it possible for the retaining web to be driven over during the automated wiring, for example by means of a wiring robot, wherein the retaining web is displaced by the wiring robot by elastic deformation and springs back into its starting position again after the driving over.

For this purpose, in one embodiment, the retaining web can be fixed at its first end to the first side wall and extend with an elastic spring leaf having the free end from the first side wall in the direction of the opposite side wall.

The elastic spring leaf can have a length in its extension direction from the first side wall to the opposite second side wall which is smaller than the distance of the two side walls from each other.

The retaining web can have clamping means at its first end for fastening the retaining web to at least one tongue or between and/or to adjacent tongues of the first side wall. In this case, the retaining web can have an elastic spring leaf starting from the first end, preferably integrally formed thereon, with which the retaining web extends in the direction of the opposite side wall.

The clamping means can have at least one clamping receptacle which is formed in a groove-shaped manner and is configured to be pushed onto the relevant clasp in the frictional connection via a longitudinal edge of one of the adjacent clasps. Preferably, in each case one of the named clamping receptacles is formed on the opposite sides of the clamping means which in each case face one of the two adjacent clasps.

The retaining web can be arranged in the extension direction of the tongues below the widening and above, preferably spaced apart from the bottom.

Particularly advantageously, in each case at least one elastic retaining web can extend through the cable duct from a first and a second of the two parallel side walls in the direction of the respective other side wall. In this case, the retaining webs extending from the opposite side walls can extend towards one another in pairs and approach or overlap one another with their free ends up to a minimum distance.

The retaining webs can be configured in particular to be driven through or over by an end effector of an automatic wiring machine, for example by the end effector of a wiring robot, wherein the retaining web, at least insofar as it is elastic, is reversibly displaced in order to allow the end effector to pass through. Due to the elasticity, the retaining web can return into its starting position again after the passing through. In the starting position, the retaining web, at least its elastic portion, for example the already described elastic spring leaf, extends substantially perpendicularly to that side wall on which it is mounted. The retaining web can be arranged in particular with its free end at a distance from the opposite side wall.

In particular, the free end of the retaining web, for example the free end of the elastic spring leaf, should be arranged in an unsupported and freely movable manner in the cable duct cross-section in order to make it possible in the previously described manner for the free end of the retaining web, for example the elastic spring leaf, to be displaced when the retaining web collides, for example, with the end effector of a wiring robot when the wiring robot is guided along the cable duct during the laying of the wire.

The cable duct can have an undercut groove at its transition from the base to the tongues, which groove allows the cable duct to be gripped by means of a gripper, for example on an end effector of an articulated arm robot. Preferably, the cable duct has the already described groove on both opposite longitudinal edges of the base, along which the clasps are integrally formed on the base, in order to make possible a secure gripping of the cable duct. Such a cable duct together with a gripper is described, for example, in WO 2021/037305 A2.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Further details of the invention are explained with reference to the following figures. In the figures.

Figure 6:
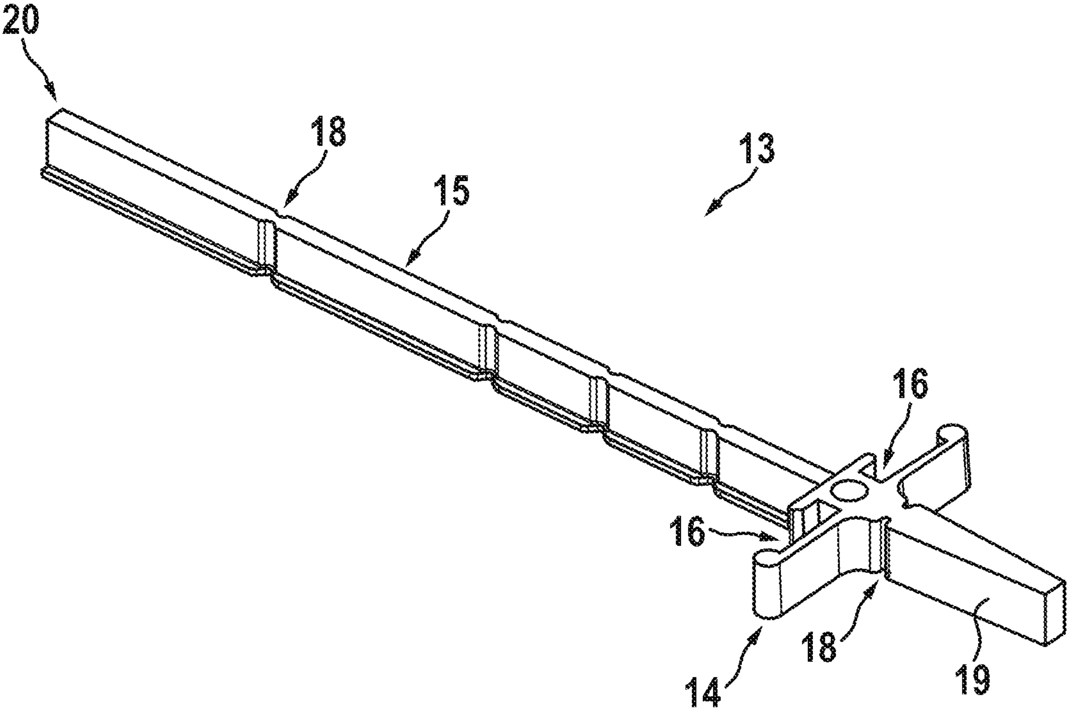

FIG. 6. shows an alternate embodiment of a retaining web.

DETAILED DESCRIPTION

Example embodiments will now be described more fully with reference to the accompanying drawings.

Figure 1:
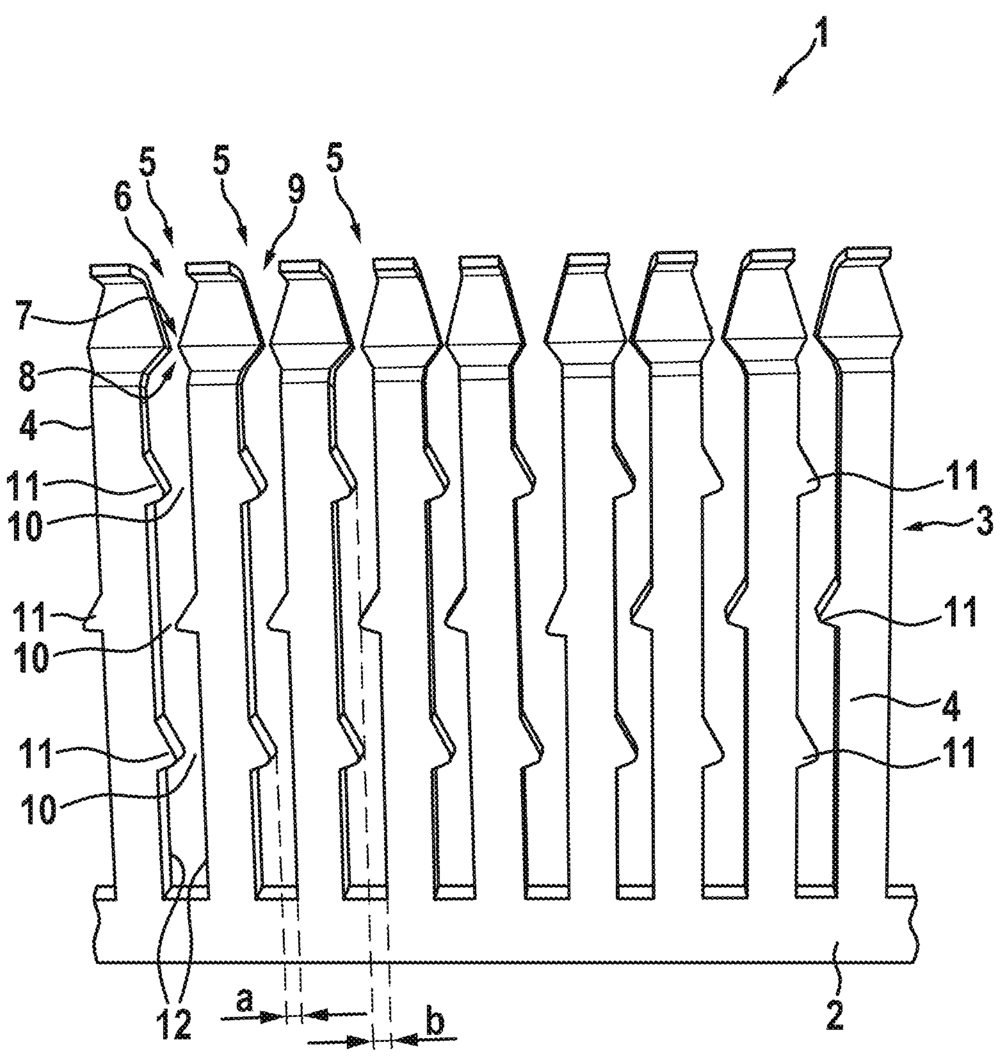
FIG. 1 shows an exemplary embodiment of a cable duct according to the invention in a side view.

FIG. 1 shows an exemplary embodiment of a cable duct 1 according to the invention in side view. The latter has a base 2 which is configured to be mounted on a support. The support can be, for example, a mounting plate of a switch cabinet. For this purpose, the base 2 can have recesses and apertures 2.1 (cf. FIG. 2) in the manner known from the prior art for screwing the cable duct 1 onto a mounting plate or the like.

The side walls 3 of the cable duct 1 are formed, in particular integrally formed, along the longitudinal edges of the base 2. The side walls 3 in turn each consist of a plurality of tongues 4, which delimit slots 5 between them. Conductors can be inserted into the cable duct 1 through the slots 5.

In the course of the automated wiring, the cable is inserted through the side wall 3 via the open upper side of the cable duct 1, consequently via the free ends of the tongues 4 or the slots 5 formed between adjacent tongues 4. For this purpose, the cable duct 1 according to the invention has a cable insertion aid 6, which in the embodiment of the invention shown has a V-shaped widening of the slot 5 or is formed as such. The V-shaped widening makes it possible to insert the flexible conductors, for example copper strands and the like, into the slot 5 via the cable insertion aid 6 in a reliably fully automated manner, for example with the aid of an articulated arm robot. After the conductor has been inserted via the free ends of the slot 5, i.e. via the cable insertion aid 6 into the uppermost section of the slot 5, where the conductor can still easily emerge again from the slot 5, it is necessary for the conductor to be pressed further downward, for example with the aid of the end effector, so that it can overcome a tapering 7 of the slot, which directly adjoins the cable insertion aid 6 or the V-shaped contour of the cable insertion aid 6, with elastic deformation of the tongues 4. The tapering 7 tapers the slot 5 precisely at least to an opening width which is arranged in the relaxed state of the tongues 4, i.e. when the tongues 4 are not mechanically loaded, for example by a conductor pressed in via the cable insertion aid 6, in the starting position shown in FIG. 1, in which the opening cross-section is smaller than a conductor cross-section. For the insertion of the conductor, it is thus necessary for the conductor to overcome the tapering 7 under pressure, wherein the tapering 7 is briefly elastically widened for the passage of the conductor. After the conductor has passed the tapering 7 and has been transferred into the widening 8 of the slot 5, the widened tongues 4 can be relaxed again and transferred into the state shown in FIG. 1, in which the tapering 7 is reduced again to the described starting opening dimension, which is preferably at least smaller than a processed conductor cross-section.

In a further longitudinal extent of the slot 5 from the cable insertion aid 6 toward the bottom 2 of the cable duct 1, the slots 5 are limited in their opening width a, b by further taperings 10, in the present case by three further taperings per slot 5, wherein the opening width a, b of that one of the further taperings 10 which is further spaced apart from the bottom 2 than one of the further taperings 10 which is arranged closer to the insertion aid 6 can be smaller. This takes into account the fact that the tongues in the upper region, i.e. the further they are spaced apart from the bottom 2, are significantly more elastic by their length than in the lower region.

The projections 11 are visibly arranged offset from each other, wherein they are beveled in the insertion direction of a conductor into the slot 5 from top to bottom toward the center of the slot 5. Viewed from bottom to top, the projection 11 is perpendicular to the longitudinal edge 12. On the underside, the projection 11 has an edge which extends perpendicularly to the longitudinal extent of the longitudinal edge 12 and thus forms a barb for inserted conductors and cables.

In order to distribute the lines in the cross section of the cable duct 1, any number of the projections 11 can be arranged offset from each other. It is particularly advantageous if the projections 11 are embodied so as to decrease in their dimension perpendicularly to the longitudinal edge 12 from top to bottom and thus an easy pressing in of the wire itself to below the lowermost projection 11 is made possible. This takes into account the fact that the tongues 4 are significantly more elastic in the upper region due to their length than in the lower region, in which they are coupled to the base 2, for example integrally formed.

Figure 2:
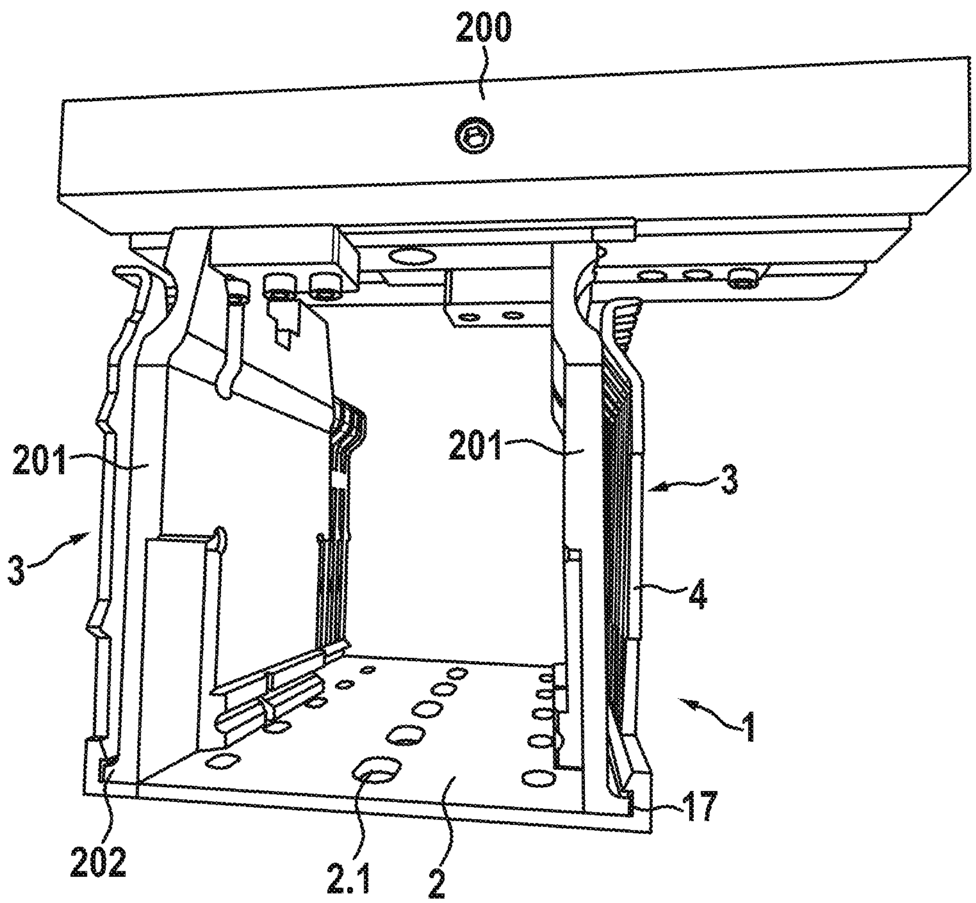
FIG. 2 shows an arrangement of a cable duct according to the invention, which is gripped by a gripper for handling the cable duct.

FIG. 2 illustrates an embodiment of the cable duct 1 according to the invention, which has a longitudinal groove 17 at its transition from the side walls 3 to the base 2. This groove 17 serves for the reliable handling of the cable duct 1 with a robot. A gripper 200 of a placement robot is shown, which gripper engages with gripper plates 201 on the opposite side walls 3 of the cable duct 1, more precisely in each case with a gripper web 202 on the outer sides of the gripper plates 201 facing away from each other, engages in the groove 17 at the transition between the base 2 and the side walls 3. The base 2 further has recesses 2.1, which serve for mounting the cable duct 1 on a support, for example on a mounting plate. A stabilization of the highly elastic side walls 3 during handling of the cable duct 1 is achieved by the flat design of the gripper plates 201 and thus destruction of the cable duct 1, in particular the breaking out of individual or a plurality of tongues 4, is reliably avoided.

Figure 3:
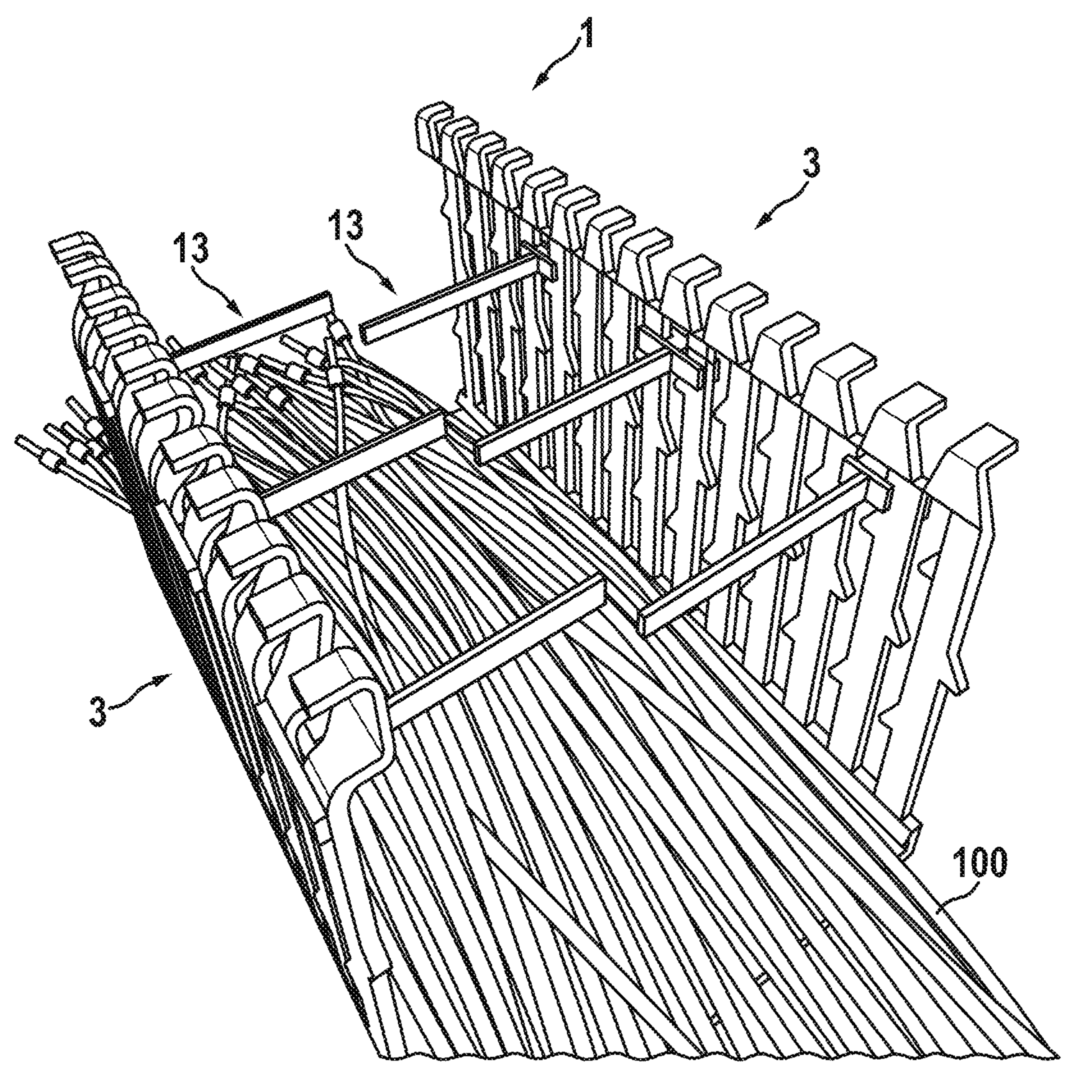
FIG. 3 shows a further embodiment of a cable duct according to the invention with retaining webs inserted therein.
Figure 4:
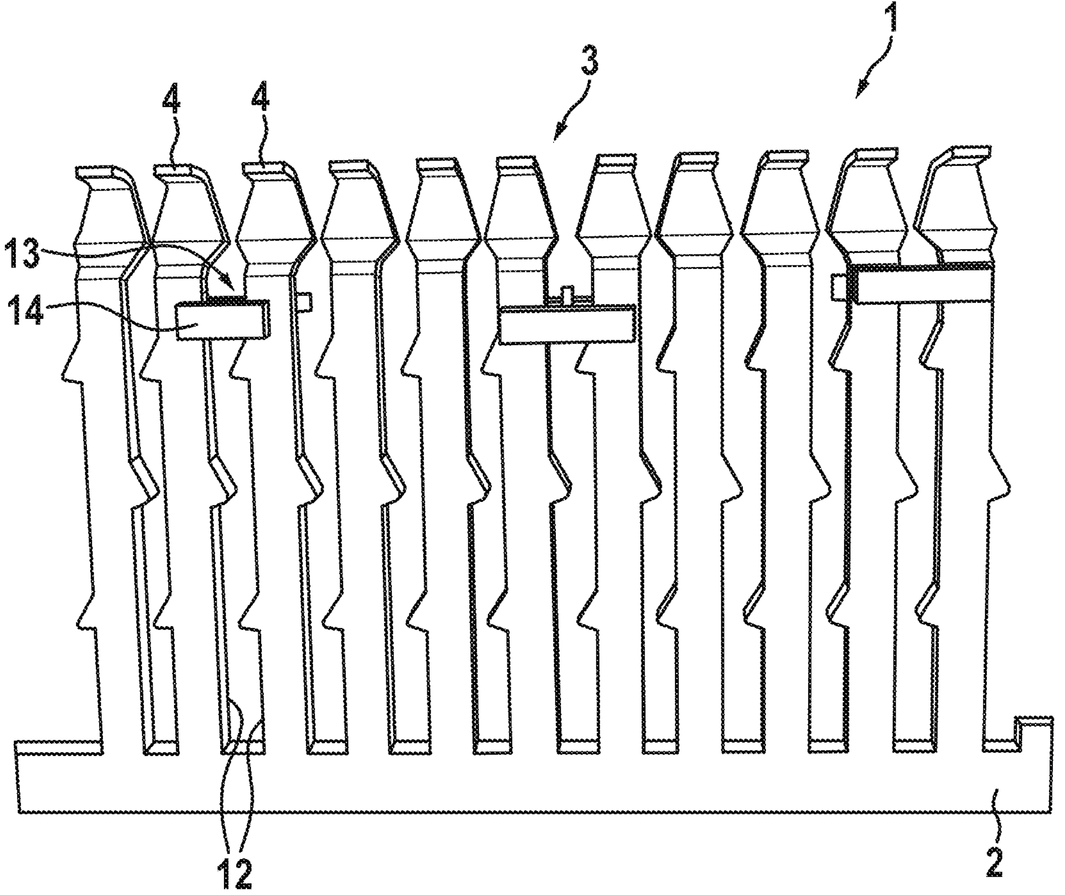
FIG. 4 shows a side view of the embodiment according to FIG. 3.
Figure 5:
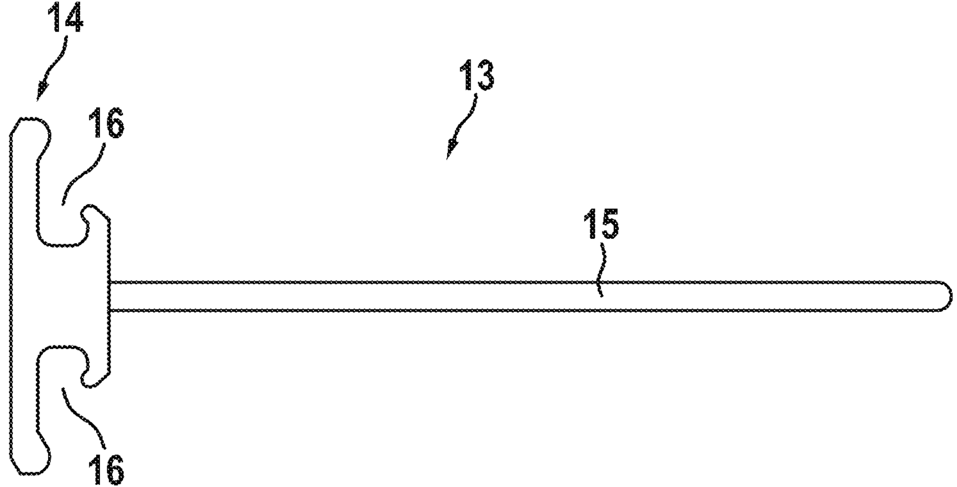
FIG. 5 shows an exemplary embodiment of a retaining web.

FIGS. 3 to 5 illustrate an embodiment of the cable duct according to the invention, in which a plurality of retaining webs 13 are provided, which are inserted into the side walls 3. The retaining webs 13 prevent wires already inserted and/or inserted into the cable duct 1 from being able to move out of the cable duct 1 again, for example due to an elastic inherent tension, which has been impressed on the wires during insertion into the duct 1. In the present case, the retaining webs 13 have a length perpendicular to the side wall 3, which corresponds approximately to half the width of the cable duct 1 perpendicular to the side walls 3. The retaining webs 13 have an elastic spring leaf 15, so that during the laying of the wires 100, for example with the aid of a wiring robot, the end effector of the wiring robot can drive through the cable duct 1 without interference in order to lay the wire in the duct. In order to be able to lay the cables below the retaining webs 13, the robot must dip with its end effector to below the retaining webs 13, which in turn has the consequence that the end effector must be able to pass the retaining webs 13 during the laying along the duct 1 without colliding with them. In contrast to the retaining webs known from the prior art, it is provided for this purpose that the retaining web 13 is held only at one of the opposite side walls 3, between which the retaining web 13 extends, and has a free end at the opposite end. The free end is formed as a spring leaf 15, so that the retaining web 13 or its spring leaf 15 can be reversibly displaced when meeting the end effector of the robot. Due to the restoring force of the spring leaf 15 increased during the displacement, the retaining web 13 can return into its straight starting shape shown in the figures immediately after passing the end effector, so that the emergence of cables 100 from the duct 1 is effectively prevented.

In the embodiment shown in FIGS. 3 to 5, the retaining webs 13 or the spring leaves 15 of the retaining webs 13 extend substantially over half the distance between the side walls 3. Accordingly, it can be provided that in each case one retaining web 13 is connected to the respective side wall 3 more or less exactly opposite one another, so that the two retaining webs 13 are directed towards one another with their free ends. In this case, the retaining web 13 or the spring leaves 15 of the retaining webs 13 can approach, touch or even overlap up to a minimum distance.

The retaining webs 13 are locked via a clamping means 14 to the tongues 4 of the side walls 3 or in the slot 5 between adjacent tongues 4, wherein the clamping means 14 is in frictional connection via a clamping receptacle 16 with preferably both, but at least one of the two tongues 4, in order to lock the retaining web 13 to the tongue 4 or to the two adjacent tongues 4.

The cable duct 1 can be formed in a known manner as an extruded and stamped plastic component, in which the tongues 4 have the flexibility caused by the component. The retaining webs 13 can also be formed from an elastic plastic material. In particular, the retaining web 13 can be formed integrally and overall from a single plastic material, which has the material stiffness required for providing the elasticity of the spring leaf 15.

FIG. 6 shows an embodiment of a retaining web 13 according to the invention, which is configured in particular to bridge the entire cable duct width with its spring leaf 15 without the use of an opposite, complementary retaining web. Consequently, the retaining web 13 is fixed to a first of the opposite side walls of the cable duct in the previously described manner and extends with its spring leaf 15 from this side wall in the direction of the second, opposite side wall. With its free end 20 facing away from the clamping means 14, it can be brought close to the second side wall up to a small distance, wherein its free movability is obtained in order to make possible the previously described elastic displacement of the spring leaf 15 during the driving over of the spring leaf 15.

In order to adapt the retaining web 13 to a given cable duct width, the spring leaf 15 has a plurality of predetermined breaking points 18, which represent common cable duct widths. For simple handling, the retaining web 13 has a grip piece 19 on the clamping means 14, consequently on an end facing away from the free end 20. The grip piece 19 can also be fastened to the clamping means 14 via a further predetermined breaking point 18, in order to be able to remove the grip piece 19 as required after mounting, for example if it should represent an interfering contour during the further construction of the switching system. The retaining web 13, as well as the retaining web according to FIG. 5, can be formed as a 2K plastic component, wherein the grip piece 19 has a material strength aligned with the clamping on the tongues of the cable duct, while the spring leaf 15 has the strength and elasticity required for its elastic displacement.

The features of the invention disclosed in the above description, in the drawing and in the claims can be essential both individually and also in any combination for the realization of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A cable duct for the automated wiring of an electrical control or switching system, comprising:

wherein the cable duct has a bottom for mounting on a base and two parallel side walls which are each formed by a plurality of tongues extending perpendicularly from the bottom, wherein adjacent tongues of the same side wall have between them a slot for the cable passage with a cable insertion aid which is arranged in an end position at a free end of the adjacent tongues facing away from the bottom, wherein the cable insertion aid in the end position opens in the direction of extension of the tongues from the free ends to the base into a tapering of the slot and preferably the tapering of the slot opens into a widening of the slot, wherein the slot has at least two further taperings along the length of the slot from the widening to the bottom, which have a passage cross-section with a different minimum opening width.

2. The cable duct according to claim 1, wherein the cable insertion aid is widened in the direction from the tapering to a cable insertion opening of the cable insertion aid.

3. The cable duct according to claim 2, wherein the cable insertion aid is widened in a V-shaped or substantially V-shaped manner in the direction from the tapering to the cable insertion opening.

4. The cable duct according to claim 1, wherein the widening is formed in a V-shaped or substantially V-shaped manner, wherein the widening preferably has an inverted V-shape compared to the tapering.

5. The cable duct according to claim 1, wherein the slot has a constant width both in a section adjacent to the widening and also at least in sections over the length of the slot from the widening to the bottom.

6. The cable duct according to claim 1, wherein the minimum opening width of that one of the two further taperings which is further spaced apart from the bottom than the other further tapering is smaller than the minimum opening width of the further tapering arranged closer to the bottom.

7. The cable duct according to claim 1, wherein the further tapering is formed by a, preferably by exactly one, projection projecting into the slot on a first of two opposite longitudinal edges of the adjacent tongues delimiting the slot.

8. The cable duct according to claim 7, wherein the projection extending from the first longitudinal edge is arranged upstream of the second longitudinal edge opposite the first longitudinal edge at a distance which corresponds to the opening width of the further tapering, wherein the second longitudinal edge is a straight and/or uncontoured longitudinal edge at least in the region of the further tapering, preferably further upstream and downstream of the tapering.

9. The cable duct according to claim 1, wherein a plurality of the further taperings is formed by in each case one, preferably by in each case exactly one, projection projecting into the slot, wherein the projections project into the slot in the longitudinal direction of the slot alternately starting from one of the two opposite longitudinal edges and are arranged upstream of the in each case other, straight and/or uncontoured longitudinal edge while maintaining a minimum opening width of the respective further tapering.

10. The cable duct according to claim 9, wherein the projections projecting into the slot alternately from the opposite longitudinal edges form the slot in a meandering manner in the longitudinal direction.

11. The cable duct according to claim 1, wherein at least one elastic retaining web extends through the cable duct starting from a first of the two parallel side walls in the direction of the opposite side wall, wherein the retaining web has a free end at its end facing the opposite side wall.

12. The cable duct according to claim 11, wherein the retaining web is fixed at its first end to the first side wall and extends with an elastic spring leaf having the free end in the direction of the opposite side wall.

13. The cable duct according to claim 12, wherein the elastic spring leaf has a length in its extension direction from the first side wall to the opposite second side wall which is smaller than the distance of the two side walls from each other.

14. The cable duct according to claim 11, wherein the retaining web has clamping means at its first end for fastening the retaining web to at least one tongue or between adjacent tongues of the first side wall, wherein the retaining web has an elastic spring leaf starting from the first end, preferably integrally formed thereon, with which the retaining web extends in the direction of the opposite side wall.

15. The cable duct according to claim 11, wherein the retaining web is arranged in the extension direction of the tongues below the widening and above, preferably spaced apart from the bottom.

16. The cable duct according to claim 11, wherein in each case at least one elastic retaining web extends through the cable duct from a first and a second of the two parallel side walls in the direction of the respective other side wall, wherein the retaining webs extending from the opposite side walls extend towards one another in pairs and approach or overlap one another with their free ends up to a minimum distance.

* * * * *